Patented Mar. 16, 1926.

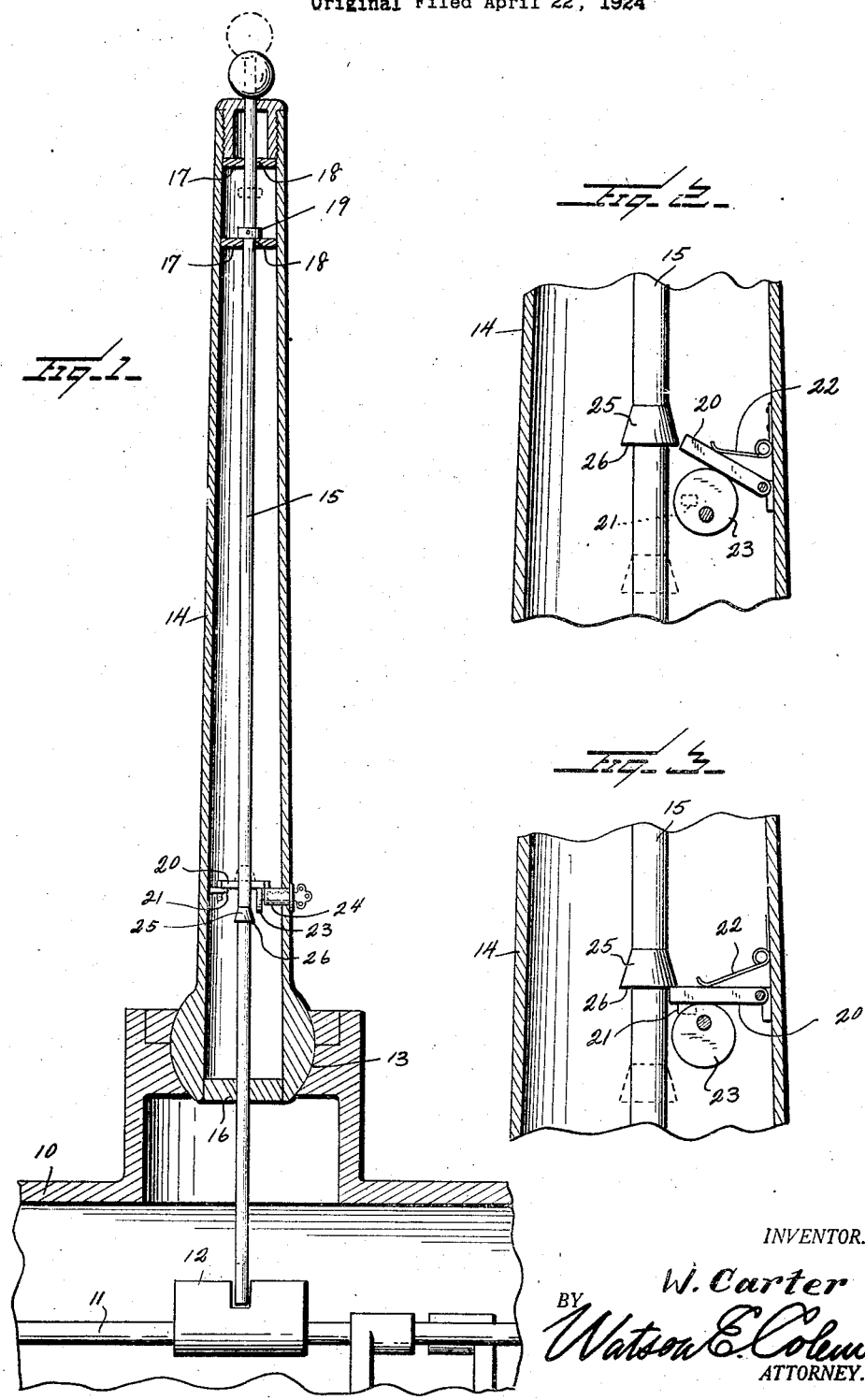

1,577,011

UNITED STATES PATENT OFFICE.

WALKER CARTER, OF BALTIMORE, MARYLAND.

TRANSMISSION SHIFTING LEVER.

Application filed April 22, 1924, Serial No. 708,265. Renewed September 17, 1925.

*To all whom it may concern:*

Be it known that I, WALKER CARTER, a citizen of the United States, residing at Baltimore, State of Maryland, have invented certain new and useful Improvements in Transmission Shifting Levers, of which the following is a specification, reference being had to the accompanying drawings.

This invention relates to improvements in transmission shifting levers and more particularly to a device of this character adapted to be locked in inoperative position and thereby prevent unauthorized use of the vehicle.

An important object of the invention is to provide a device of this character which requires no changes whatever in the construction of the transmission and which will be neat in appearance and which may be readily operated.

A further object of the invention is to provide a device of this character in which a simple upward pull upon the knob of the operating lever places the operating lever in inoperative position and automatically locks the same therein.

These and other objects I attain by the construction shown in the accompanying drawings, wherein for the purpose of illustration is shown a preferred embodiment of my invention and wherein:—

Figure 1 is a vertical sectional view taken through a gear shifting lever constructed in accordance with my invention;

Figure 2 is an enlarged sectional view showing the lock construction and the release action effected, the parts being shown in a position releasing the operating section of the rod for movement downwardly to operative position;

Figure 3 is a similar view, the parts being shown in the position in which the operating section is locked against downward movement.

Referring now more particularly to the drawings, the numeral 10 indicates the usual transmission casing having therein the usual gearing (not disclosed) and shifting rod or rods 11 by means of which the gears are shifted to vary the speeds of the transmission. These rods, in the usual construction thereof, are provided with a socket 12 for the reception of the end of the shifting lever. The transmission casing, above these rods, is provided with a ball socket 13 in which the end of the lever rests.

In accordance with my invention, this lever is formed in two telescopically engaged sections, an outer tubular section 14 and an inner rod or shiftable section 15. The tubular section is provided at its lower end with a ball for engagement in the socket and in this ball the lower end of the rod 15 has its bearing as indicated at 16. Adjacent its upper end the tube 14, which preferably tapers upwardly, is provided with a pair of spaced plates 17 which are secured to the walls of the tube within the tube and are formed with bearings 18 for guiding the upper end of the rod. The rod is preferably both rotatable and longitudinally shiftable through these bearings but must in most instances be made longitudinally shiftable therethrough. Between the plates 17, the rod is provided with a stop 19 which by its engagement with the plates 17 limits the longitudinal shifting movement of the rod. When the stop 19 of the rod is in engagement with the lower plate 17, the end of the rod is sufficiently depressed to engage in the socket of the socket casting 12, so that these castings and accordingly the rods 11 may be shifted thereby. When elevated the rod clears these sockets so that any shifting of the lever will not result in shifting of the rods 11.

Within the tube at the larger portion thereof and preferably immediately adjacent the lower end thereof is arranged a hinged leaf 20 movement of which is limited when the leaf is horizontal by a stop 21. A spring 22 normally urges this leaf into engagement with the stop and the leaf may be shifted upwardly at its free end and accordingly moved out of engagement with the stop by a cam 23 carried by the rotating part of a barrel lock 24 of any suitable description. The rod is provided with an enlargement 25 forming a downwardly facing shoulder 26 which, when engaged with the upper surface of the leaf 20, maintains the rod in elevated position so that it cannot engage in the sockets of the castings 12. This shoulder preferably extends entirely about the rod so that the rod may be rotated without this engaging shoulder. By elevating the rod and then operating the key of the barrel lock, the leaf may be swung out of position so that the rod may be dropped for engagement in the socket to shift a selected rod 11. The upper end of the rod has preferably applied thereto a suitable cap for engagement by the hand.

It is pointed out with a construction of this character not only is the machine safeguarded against unauthorized operation but likewise operation of the gear shift is facilitated for the reason that since the rod may turn in the hand, such changes in the angle of the rod, as are necessary during shifting of the gears, may be accomplished without the necessity of the hand moving about upon the upper end of the rod, the rotation of the rod permitting the rod to remain stationary in the hand while these changes of angle are effected. Since the construction hereinbefore set forth is capable of a certain range of change and modification without materially departing from the spirit of my invention, I do not limit myself to such specific structure except as hereinafter claimed.

I claim:—

In a transmission shifting lever and in combination, an outer lever section mounted for oscillation upon the transmission casing, a second section longitudinally shiftable through the first named section between certain limits and when at one limit of its movement engageable in the sockets of the shifting lugs of the transmission, and means mounted within the first named section and operatively engaging the second named section permitting elevation of the second named section but preventing return movement thereof after such elevation, comprising a hinged leaf carried by the first named section and normally maintained in horizontal position therein, the second section being provided with an enlargement forming a downwardly facing shoulder, said leaf swinging upwardly to permit passage of said enlargement.

In testimony whereof I hereunto affix my signature.

WALKER CARTER.